UNITED STATES PATENT OFFICE.

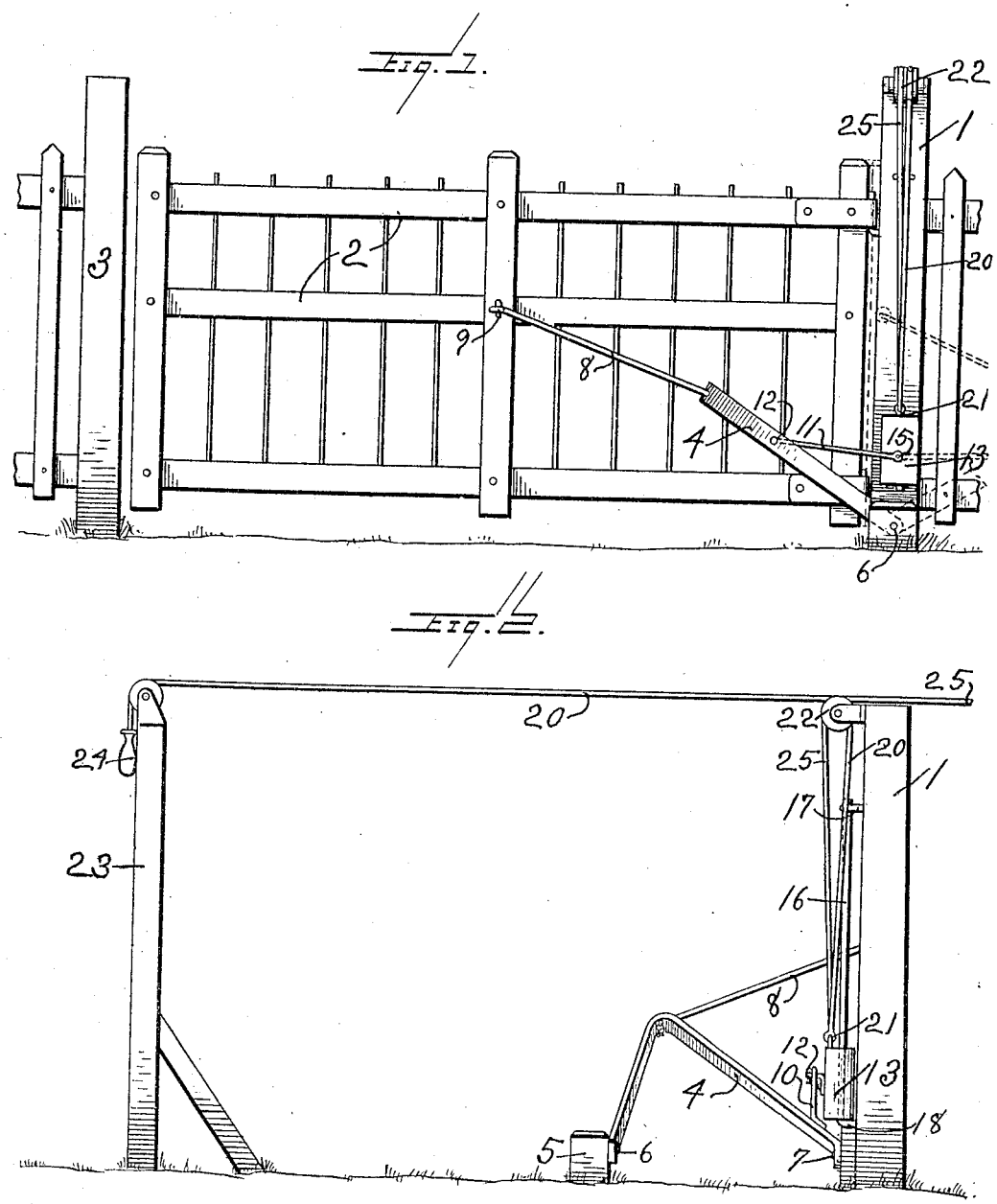

ENOS W. HARDEN, OF FRANKFORT, KENTUCKY.

FARM-GATE.

No. 876,177.  Specification of Letters Patent.  Patented Jan. 7, 1908.

Application filed October 21, 1907. Serial No. 398,450.

*To all whom it may concern:*

Be it known that ENOS W. HARDEN, a citizen of the United States, residing at Frankfort, in the county of Franklin, State of Kentucky, has invented certain new and useful Improvements in Farm-Gates, of which the following is a description, reference being had to the accompanying drawings, forming a part hereof.

My invention relates to farm gates of the type adapted to swing across the roadway to be closed, and, more particularly, to swinging gates provided with operating means whereby the gate may be operated by a rider from a distance and without dismounting or alighting.

More specifically stated, my invention relates to swinging gates of the type above defined and in which the operating mechanism includes means for positively locking the gate in either its open or its closed position, so that the gate when in its open or closed position cannot be operated in either direction by an animal or by the force of the wind.

The object of my invention is to provide an improved farm gate of the type above specified; and my invention consists in the farm gate illustrated in the accompanying drawing, described in the following specification, and particularly claimed in the clauses of the concluding claim.

In the drawing, Figure 1 is a front elevation of my improved gate in its closed position, and, Fig. 2 is a side elevation of my improved gate as seen from a position at the right of Fig. 1.

In the drawing, 1 represents an upright supporting post upon which is hinged the gate 2 adapted to swing across and close the opening between the post 1 and the terminal post 3 of a fence.

My improved gate is swung about the post 1 as an axis by means including an operating member 4 shown as pivotally connected with the post 1 and with an auxiliary support 5 at 6 and 7, so that it may be swung upon a horizontal axis passing through the pivotal points 6 and 7 to swing the gate, the extreme positions of the member 4 being shown in full and in dotted lines in Fig. 1. The operating member 4 is preferably formed from bar iron, and is of considerable weight so that the force exerted thereby will be the principal force whereby the gate is operated.

8 is a pitman connecting the operating member 4 with the gate 2, and connected therewith by a joint at 9 permitting universal movement.

10 is an arm forming part of the operating member 4; and 11 is a second pitman pivotally connected with the end of the arm 10 at 12, and also pivotally connected with a vertically movable sliding member 13 at 15.

The vertically movable slide moves upon and is guided in its movement by a suitable guide, which I have illustrated as comprising a vertically extending rod 16 secured at its ends 17 and 18 to the post 1 and which rod is shown as passing through the sliding member 13. It is obvious, however, that other forms of the vertical guide might be employed, the form of the sliding member being modified to fit and move upon the particular form of guide employed.

I prefer to make the slide 13 of considerable weight, so that as it moves downward it will assist the operating member 4 in swinging the gate, and have therefore illustrated said member as a weight.

The downward movement of the slide 13 is limited by a suitable stop at 18; and the second pitman 11 is connected with the said slide at such a point that when the gate 2 is in either its open or closed position the end of said second pitman connected with the slide at 15 will be slightly lower than the other end thereof connected with the arm 10 at 12. With this construction it will be evident that the slide 13 can not be forced upward by a force tending to lift the operating member 4, and the gate will be positively locked in whichever of its open or closed positions it happens to be.

20 is a flexible operating member connected with the slide 13 at 21 and extending upward and over a pulley 22 at the top of the post 1, and to an auxiliary post 23 where it is provided with a suitable handle 24. It will be seen that this flexible member enables the slide 13 to be drawn upward and the gate operated from the auxiliary post 23, which may be placed at any convenient distance from the gate.

25 is a second flexible operating member extending to a second auxiliary post on the other side of the gate.

In swinging farm gates having operating means including a swinging member resembling somewhat the swinging member 4, there is ordinarily no means provided for preventing upward movement of the said member; so that it frequently happens in actual use that the said member is raised by an animal and the gate thereby opened. It will be seen, however, that in the operating means employed by me the liability of the gate to be operated as above pointed out is greatly reduced, if not entirely eliminated; for the operating member is locked in its extreme positions by the pitman 11 and can be swung upon its axis and the gate operated only upon upward movement being imparted to the slide 13. Furthermore, if the weighted slide 13 were raised by an animal to even a considerable distance it would in falling again close the gate; and the possibility of the slide being thus accidentally raised to its extreme height, as is necessary in order to swing the gate into its extreme open and closed position, is extremely slight.

Briefly stated, the operation of my gate is as follows: A rider upon approaching the gate grasps the handle 24 and pulls upon the flexible member 20, thereby lifting the weighted slide 13 and imparting a swinging movement to the operating member 4. The lifting force should be continued until the slide 13 reaches its highest point, by which time the moving parts will have acquired sufficient momentum to carry the swinging member 4 past the central point of its movement, whereupon the weight of the various operating parts will become effective to continue the movement of the gate into its open position, the slide then being again in its lowermost position and the operating member 4 in the position shown in dotted lines in Fig. 1.

Having thus described my invention and explained the operation thereof, I claim and desire to secure by Letters Patent:—

1. The combination with a gate adapted to swing about a vertical axis; of an operating member adapted to swing upon a horizontal axis; a pitman connecting said operating member and said gate and through which said gate may be operated; a vertically extending guide; a slide adapted to move upon said guide; a second pitman connecting said slide and operating member and through which said member may be swung upon its axis to swing the gate into an open or closed position; and means for operating said slide.

2. The combination with a gate adapted to swing about a vertical axis, of an operating member adapted to swing upon a horizontal axis; a pitman connecting said operating member and said gate and through which said gate may be operated; a vertically extending guide; a slide adapted to move upon said guide; a second pitman connecting said slide and operating member and through which said member may be swung upon its axis; and means for operating said slide, the relative arrangement of the parts being such that when the slide is in its lowest position the gate will be locked in either its open or closed position.

3. The combination with a gate adapted to swing about a vertical axis, of an operating member adapted to swing upon a horizontal axis; a pitman connecting said operating member and said gate and through which said gate may be operated; a vertically extending guide; a slide adapted to move upon said guide; a second pitman connecting said slide and operating member and through which said member may be swung upon its axis; and means for operating said slide, the relative arrangement of the parts being such that when the slide is in its lowest position the end of the second pitman aforesaid connected therewith will be below the end of said pitman connected with the operating member.

4. The combination with a gate adapted to swing about a vertical axis, of an operating member adapted to swing upon a horizontal axis; a pitman connecting said operating member and said gate and through which said gate may be operated; a vertically extending guide; a vertically movable slide guided in its movement by said guide; a second pitman connecting said slide and operating member and through which said member may be swung upon its axis to swing the gate into an open or closed position; and a flexible connection attached to said slide and by means of which it may be moved in a vertical direction.

5. In a device of the class described, a vertical post; a gate hinged to said post; an operating member for swinging said gate, said member being adapted to swing upon a horizontal axis; a pitman connecting said operating member and said gate; a vertically movable slide; a guide secured to said post and adapted to guide said slide in its movement; a second pitman connecting said slide and operating member and through which said member may be swung upon its axis to swing the gate into an open or closed position; a flexible operating member attached to said slide; and a pulley carried by said post and through which said operating member passes.

6. In a device of the class described, a vertical post; a gate hinged to said post; an operating member for swinging said gate, said member being adapted to swing upon a horizontal axis; a pitman connecting said operating member and said gate; a vertically movable slide; a guide secured to said post and adapted to guide said slide in its movement; a second pitman connecting said slide and operating member and through which said member may be swung upon its axis to swing the gate into an open or closed position; a flexible operating member attached to said slide; and a pulley carried by said post and through which said operating member passes, said guide extending downward to such an extent that when the slide is in its lowest position the second pitman will occupy an inclined position with its end attached to the slide the lower.

This specification signed and witnessed this eighteenth day of October A. D. 1907.

ENOS W. HARDEN.

In the presence of—
A. L. MANFORD.
J. E. MANFORD.